United States Patent [19]

Ohnaka

[11] Patent Number: 4,802,028

[45] Date of Patent: Jan. 31, 1989

[54] METHOD AND APPARATUS FOR ERASING A MAGNETIC DISC EMPLOYING ERASING SIGNALS HAVING AT LEAST TWO DIFFERENT FREQUENCIES

[75] Inventor: Takashi Ohnaka, Hirakata, Japan

[73] Assignee: Sanyo Electric Co., Ltd., Osaka, Japan

[21] Appl. No.: 38,683

[22] Filed: Apr. 15, 1987

[30] Foreign Application Priority Data

May 16, 1986 [JP] Japan ................................ 61-113108

[51] Int. Cl.$^4$ ............................................. G11B 5/024
[52] U.S. Cl. ......................................... 360/66; 358/906
[58] Field of Search ........................... 360/57, 66, 118; 358/906

[56] References Cited

U.S. PATENT DOCUMENTS

| | | | |
|---|---|---|---|
| 2,657,277 | 10/1953 | Brastad | 360/118 |
| 3,449,529 | 8/1965 | Camras | 360/66 |
| 4,571,643 | 2/1986 | Namiki | 360/66 |
| 4,626,934 | 12/1986 | Yoshida et al. | 360/66 |
| 4,714,969 | 12/1987 | Bischoff et al. | 360/66 |

FOREIGN PATENT DOCUMENTS 59-221805 12/1984 Japan.
61-902 1/1986 Japan.

OTHER PUBLICATIONS

Japanese Periodical "Nikkei Electronics", Jul. 2, 1984, pp. 80–85.

Primary Examiner—Raymond F. Cardillo
Assistant Examiner—Kevin Fournier
Attorney, Agent, or Firm—Armstrong, Nikaido, Marmelstein & Kubovcik

[57] ABSTRACT

When a recording track on a magnetic disc (10) is erased, a first erasing signal $f_1$ with an upper limit of frequency (10 MHz) in a recording signal band is supplied through a magnetic head 14 over a period $T_1$. Since the erasing signal $f_1$ is attenuated and vibrated in a period $T_{12}$, the residual component is minimized. A second erasing signal $f_2$ with an upper limit of frequency (20 MHz) which is outside of the recording signal band and can be recording and reproduced by the magnetic head is supplied through the magnetic head 14 over a period $T_2$, so that the residual component of the erasing signal $f_1$ is erased. Since the erasing signal $f_2$ is attenuated and vibrated in a period $T_{22}$, the residual component is minimized.

9 Claims, 4 Drawing Sheets

METHOD AND APPARATUS FOR ERASING A MAGNETIC DISC EMPLOYING ERASING SIGNALS HAVING AT LEAST TWO DIFFERENT FREQUENCIES

BACKGROUND OF THE INVENTION

1. Field of the Invention

The present invention relates to a method and an apparatus for erasing a magnetic disc and more particularly, a method and an apparatus for erasing a recording track formed concentrically on the magnetic disc used, for example, in an electronic still camera.

2. Description of the Prior Art

Recently, an electronic still camera has been developed, which is disclosed in Japanese Periodical "Nikkei Electronics", July 2, 1984, pp. 80-85. Such an electronic still camera is adapted such that a plurality of tracks are formed concentrically on a magnetic disc and signals for a field or a frame of an imaged still picture are recorded on each track.

Erasing of a recording track on the magnetic disc for the electronic still camera is generally performed by recording an erasing signal with a frequency higher than the recording frequency (0-12 MHz). However, if frequency of the erasing signal is set too high, the efficiency of erasing is reduced, so that a recording signal, particularly the low frequency component thereof remains un-erased. This is particularly caused by the fact that a recording magnetic field of the low frequency signal component reaches the deep layer of the magnetic disc.

In order to solve the problem, the following approaches have been proposed. More specifically, Japanese Patent Laying-Open Gazette No. 902/1986 discloses a first approach in which the recording track is erased by the erasing signal whose frequency is increased from an initial frequency of 2 to 3 MHz to a final frequency of about 14 MHz with time. According to the first approach, the recording magnetic field of the low frequency component is erased by the initial frequency of 2 to 3 MHz. Thereafter, as the frequency of the erasing signal becomes higher, the recording magnetic field with a higher frequency is sequentially erased. Finally, only the recording magnetic field with the final frequency of 14 MHz set outside the recording frequency band remains. As a result, recorded information is erased. However, it is difficult to form an oscillator whose frequency changes continuously from the initial frequency of 2 to 3 MHz to the final frequency of 14 MHz. In practice, it is suitable to employ an oscillator which generates the erasing signals each having a frequency such as 2, 5, 8, 11, and 14 MHz which increase in a stepping manner, as shown in FIG. 4 in the above described document. More specifically, the erasing signal of 5 MHz erases the recorded erasing signal of 2 MHz and the erasing signal of 8 MHz erases the erasing signal of 5 MHz. The point of such an erasing method is that the frequency of the first erasing signal (2 to 3 MHz in the above described example) is such that the low frequency component of the recording track can be sufficiently erased, the frequency of the n-th erasing signal is such that the (n−1)-th erasing signal can be sufficiently erased, and the frequency of the last erasing signal (14 MHz in the above described example) is outside of the recording band.

On the other hand, Japanese Patent Laying-Open Gazette No. 221805/1984 discloses a second approach in which residual distortion due to the stationary oscillation component is effectively removed by switching the erasing signal from stationary oscillation with a low frequency to damping oscillation with a high frequency at predetermined timing. Therefore, if the last erasing signal in the above described first approach is attenuated and erased as shown in the second approach, the residual value of the last erasing signal can be decreased.

However, in the erasing method according to the above described first approach, switching of the frequency from the initial frequency to the final frequency must be made over many stages. Thus, a frequency interval between the n-th erasing signal and the (n−1)-th erasing signal can not be increased, so that the structure of the apparatus can not be simplified. In addition, for the reasons described above, it is difficult to set the final frequency to a higher value, so that occurrence of the beat at the time of re-recording as described below can not be completely prevented.

In the above described second approach, the rotational speed of a driving motor of the magnetic disc must be regulated to increase the frequency at the time of damping oscillation, so that it becomes difficult to structure a circuit and switching noise occurs at the time of switching to a higher frequency.

SUMMARY OF THE INVENTION

Briefly stated, the present invention provides a method for erasing a recording track formed on a magnetic disc, comprising the steps of erasing the recording track by supplying through a magnetic head a first erasing signal having a first frequency and a first duration and performing a damping oscillation over at least a first predetermined time period during the first duration, and erasing again the recording track erased by the first erasing signal by supplying through the magnetic head a second erasing signal having a second frequency higher than the first frequency and a second duration and performing a damping oscillation over at least a second predetermined time period during the second duration.

In accordance with an aspect of the present invention, first and second erasing signals have predetermined stationary oscillation periods before predetermined damping oscillation periods, respectively.

In accordance with another aspect of the present invention, the first frequency is the frequency in the vicinity of an upper limit of a band of a signal recorded on a track and the second frequency is an upper limit of frequency which is outside of the band of the recorded signal and can be recorded and reproduced by the magnetic head.

In accordance with still another aspect of the present invention, an apparatus for erasing a recording track formed on a magnetic disc comprises a magnetic head used at least for erasing of the recording track, an erasing signal forming means for generating sequentially a first erasing signal having a first frequency and a first duration and performing a damping oscillation over at least a first predetermined time period during the first duration and a second erasing signal having a second frequency higher than the first frequency and a second duration and performing a damping oscillation over at least a second predetermined time period during the second duration, means for inputting an erase command signal, and means responsive to the erase command signal for supplying the magnetic head with the first and second erasing signals output from the erasing signal forming means.

Therefore, a primary object of the present invention is to provide a method and an apparatus for erasing a magnetic disc, and which is capable of effectively erasing a recording track with a simple structure.

Another object of the present invention is to provide a method and an apparatus for erasing a magnetic disc capable of preventing the occurrence of beat at the time of re-recording.

A principal advantage of the present invention is that when the recording track is erased by erasing signals each having a frequency the frequencies of which steppingly and increasingly change, the residual value of the frequency component of each erasing signal is decreased, so that a frequency interval between the n-th erasing signal and the (n−1)-th erasing signal can be increased.

Another advantage of the present invention is that the final frequency of the erasing signal can be set to a higher value.

Still another advantage of the present invention is that since the final frequency of the erasing signal is set to the limit of frequency which can be recorded and reproduced by the magnetic head, the residual component can be ignored.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
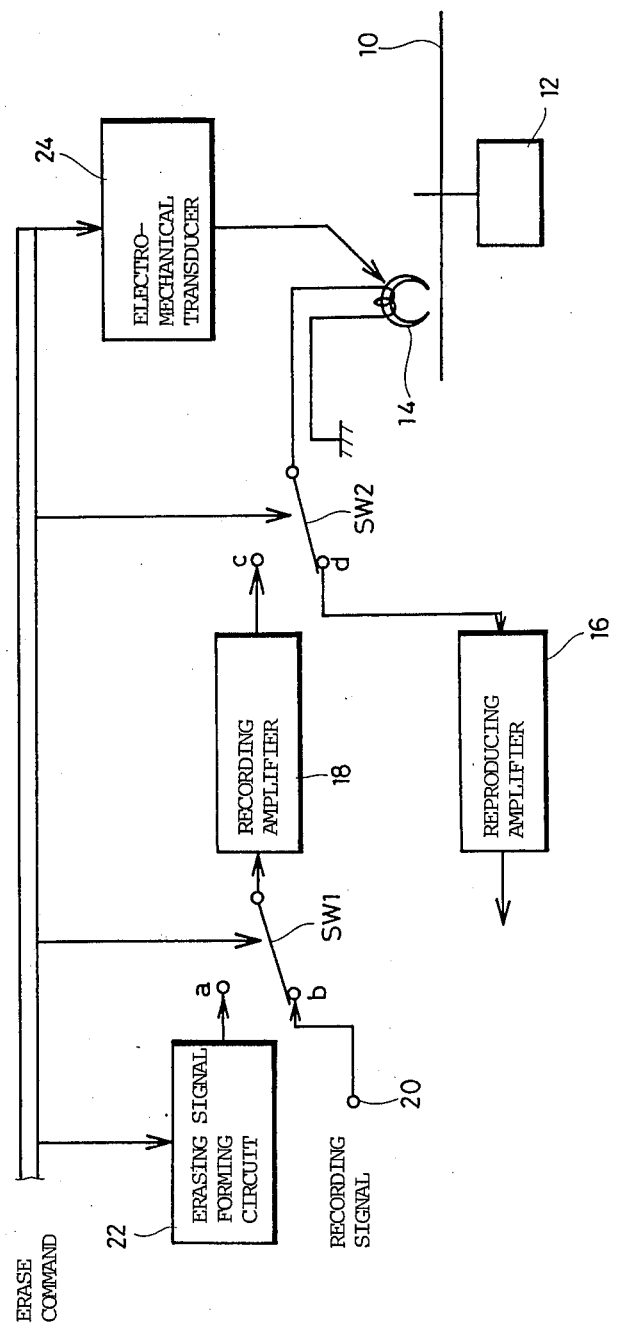
FIG. 1 is a schematic block diagram showing an embodiment of the present invention.

FIG. 1 is a schematic block diagram of an apparatus for erasing a magnetic disc according to an embodiment of the present invention.

Referring now to FIG. 1, the structure according to an embodiment of the present invention will now be described. In FIG. 1, a magnetic disc 10 is rotated and driven by a motor 12. A magnetic head 14 is used for both recording and reproduction of information onto and from the magnetic disc 10, the magnetic head 14 being attached to the top portion of a bimorph plate driven by an electro-mechanical transducer 24. On the other hand, an erasing signal forming circuit 22 is responsive to an erase command signal for generating an erasing signal which is a characteristic of the present invention, the detail of which is described below. An output of the erasing signal forming circuit 22 is connected to a contact a on the erasing side of a first switch SW1, and a recording signal is inputted to a contact b on the recording side of the switch SW1 through an input terminal 20. In addition, a common terminal of the switch SW1 is connected to an input of a recording amplifier 18. An output of the recording amplifier 18 is connected to a contact c on the recording/side of a second switch SW2, the other contact d on the reproduction side of the switch SW2 being connected to a reproducing amplifier 16. A common terminal of the switch SW2 is connected to the magnetic head 14.

Figure 2:
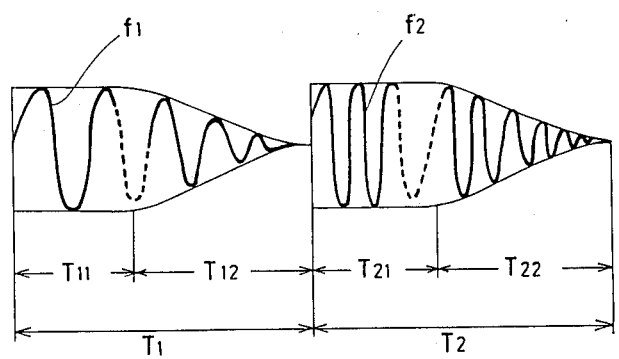
FIG. 2 is a waveform diagram showing an erasing signal according to an embodiment of the present invention.
Figure 3:
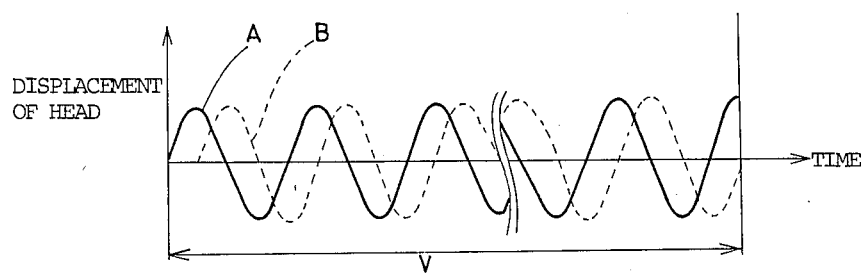
FIG. 3 is a diagram showing displacement of a magnetic head.

FIG. 2 is a waveform diagram showing the erasing signal which is a characteristic of of the present invention, and FIG. 3 is a diagram showing displacement of the magnetic head 14 in FIG. 1.

Referring now to FIGS. 1 to 3, the operation according to an embodiment of the present invention will now be described.

When recording onto magnetic disc 10, the motor 12 rotates the magnetic disc 10 at 3,600 rpm. At that time, the first switch SW1 is connected to the contact b and the second switch SW2 is connected to the contact c. The recording signal input from the input terminal 20 is supplied to the magnetic head 14 through the recording amplifier 18 and the switch SW2 and is recorded on the magnetic disc 10. During reproduction of information from the magnetic disc 10, the motor 12 rotates the magnetic disc 10 at 3,600 rpm. At that time, the second switch SW2 is connected to the contact d on the reproduction side. A signal reproduced from the magnetic disc 10 through the magnetic head 14 is input to the reproducing amplifier 16 through the second switch SW2.

Description is now made on operation of erasing of the magnetic disc 10 will now be described. At that time, the motor 12 rotates the magnetic disc 10 at 3,600 rpm. The electro-mechanical transducer 24 operates to displace slightly a bimorph plate (not shown). The period of vibration of the magnetic head 14 at that time is set such that it is shorter than the rotational period V and is out of phase with the rotational period V of the magnetic disc 10, as shown in FIG. 3. More specifically, if the displacement of the magnetic head during one turn of the magnetic disc 10 is represented by a broken line B, the displacement during the next one turn is represented by a solid line A. Therefore, uniform erasing can be performed more widely than just on the recording track. It is known that such wider erasing is performed by a bimorph plate, which is disclosed in Japanese Patent Laying-Open Gazette No. 59406/1978.

During erasing, the first switch SW1 is connected to the contact a and the second switch SW2 is connected to the contact c. The erasing signal forming circuit 22 outputs the erasing signal which is a characteristic of the present invention, as shown in FIG. 2. The erasing signal comprises a period $T_1$ when a signal $f_1$ with a frequency (10 MHz in this case) in the vicinity of an upper limit of the recording band (0 to 12 MHz) is output and a period $T_2$ when a signal $f_2$ with an upper limit of frequency (20 MHz in this case) which is outside of the above described recording signal band and can be recorded and reproduced by the magnetic head 14 is output. The periods $T_1$ and $T_2$ include periods $T_{11}$ and $T_{21}$ when the output levels are constant and periods $T_{12}$ and $T_{22}$ when the output levels are attenuated, respectively.

The action of such an erasing signal will now be described. In the period $T_{11}$, the frequency of the erasing signal $f_1$ is within the recording signal band, so that the recorded signal is effectively erased. In addition, in the period $T_{12}$, the level of the erasing signal $f_1$ is attenuated, so that the residual of the erasing signal $f_1$ is minimized. In the next period $T_{21}$, the residual component of the above described erasing signal $f_1$ is erased by the erasing signal $f_2$. In the period $T_{22}$, the level of the erasing signal $f_2$ is attenuated, so that the residual of the erasing signal $f_2$ is minimized. The frequency of the erasing signal $f_2$ is the limit of frequency which can be recorded and reproduced by the magnetic head 14, as described above, so that the residual component of the erasing signal $f_2$ can be ignored. According to the present embodiment, the above described periods $T_{11}$, $T_{12}$, $T_{21}$ and $T_{22}$ are set to 0.5 seconds, respectively. It is necessary that the frequency of the erasing signal $f_1$ is in the range of 10 to 13 MHz and the frequency of the erasing signal $f_2$ is in the range of 19 to 23 MHz.

Figure 4:
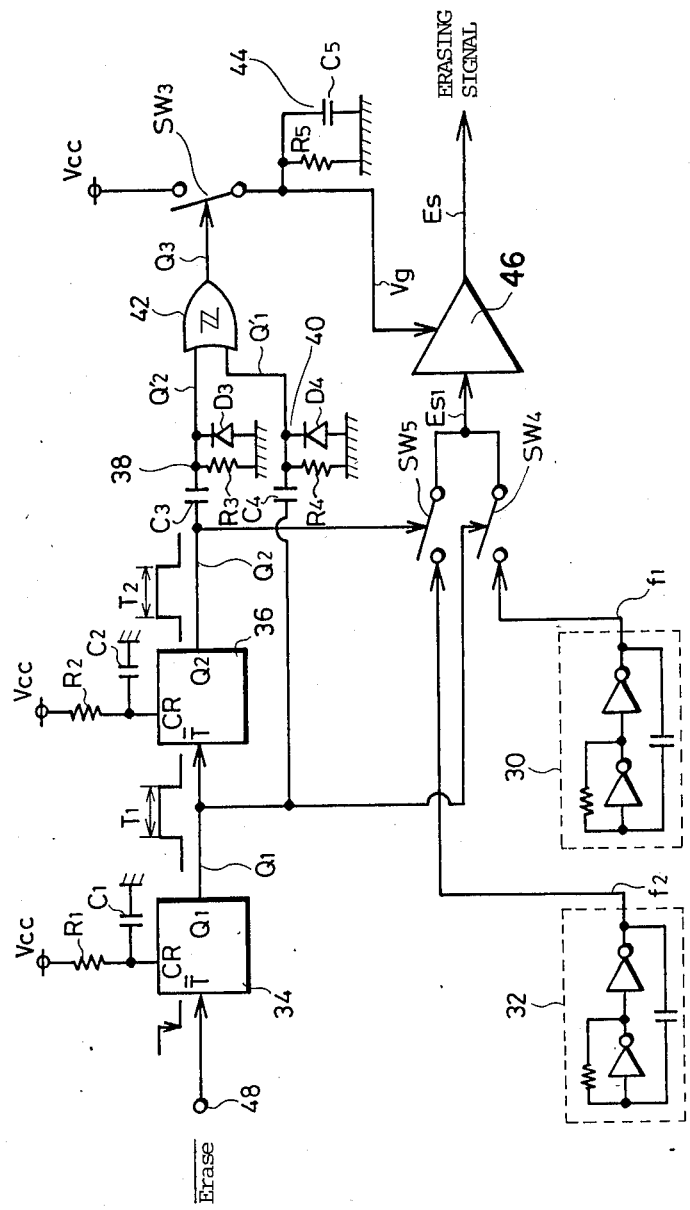
FIG. 4 is a circuit diagram showing an erasing signal forming circuit according to an embodiment of the present invention.

FIG. 4 is a circuit diagram showing the erasing signal forming circuit 22 shown in FIG. 1.

The structure of the erasing signal forming circuit 22 shown in FIG. 4 will now be described. In FIG. 4, an oscillator 30 generates a signal with the frequency of the above described erasing signal $f_1$, and an oscillator 32 generates a signal with the frequency of the erasing signal $f_2$. An output of the oscillator 30 is connected to an end of a switch SW4, and an output of the oscillator 32 is connected to an end of a switch SW5. The respective other ends of the switches SW4 and SW5 are applied to an input of a gain variable amplifier 46. A first one shot multivibrator 34 defines the above described period $T_1$ in response to an erase command signal $\overline{Erase}$ input through an input terminal 48, and a second one shot multivibrator 36 defines the above described period $T_2$ in response to an output of the first one shot multivibrator 34. The above described switches SW4 and SW5 are controlled by outputs of the first and second one shot multivibrators 34 and 36 so that the switch SW4 is closed during the period $T_1$ and the switch SW5 is closed during the period $T_2$. In addition, the outputs of the first and second one shot multivibrators 34 and 36 are applied to an OR circuit 42 having a hysteresis characteristic through differentiating circuits 40 and 38. An output of the OR circuit 42 controls the opening and closing of the switch SW3. Furthermore, the gain of the gain variable amplifier 46 is constant when the switch SW3 is closed and changes depending on an output of a time constant circuit 44 when the switch SW3 is opened.

Figure 5:
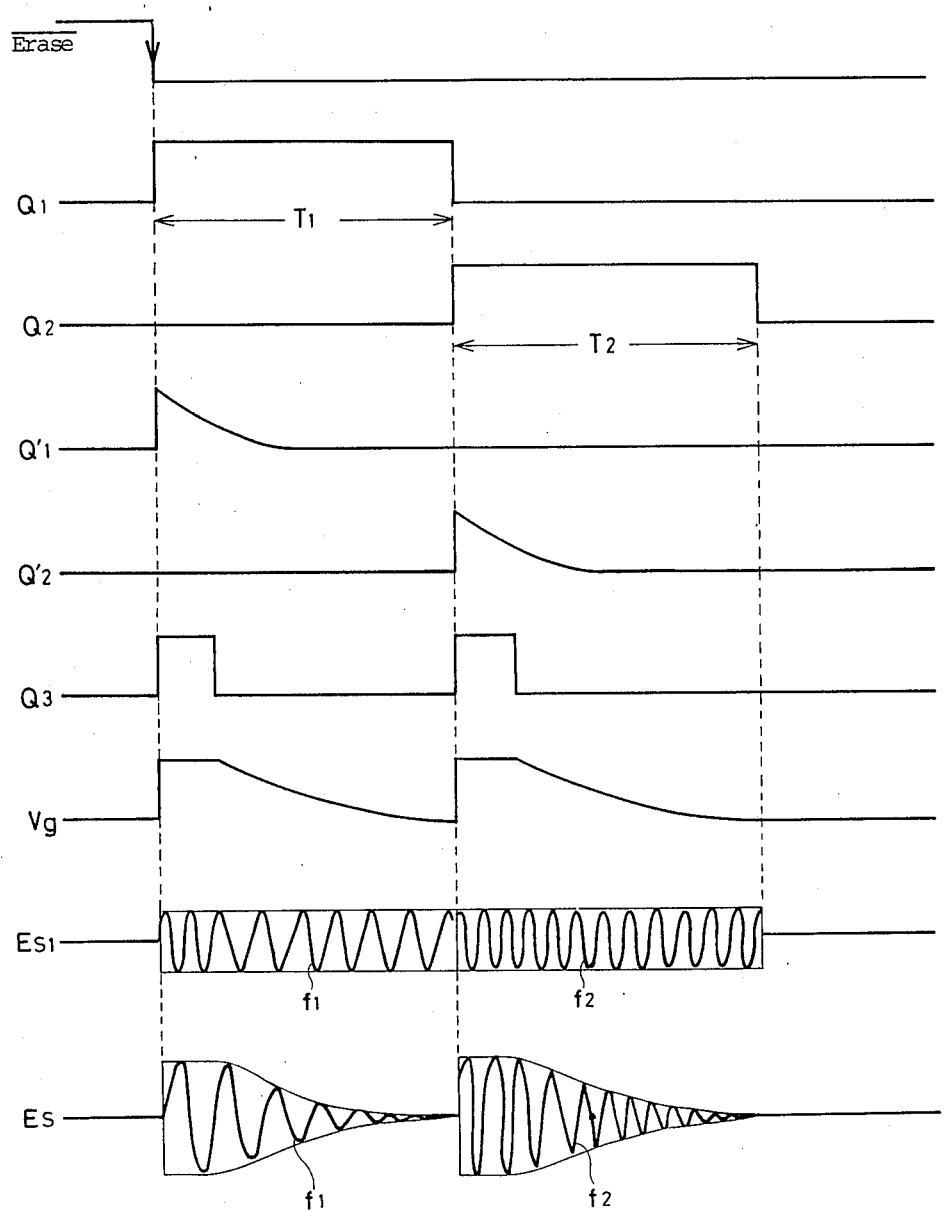
FIG. 5 is a waveform diagram for explaining the operation of the erasing signal forming circuit shown in FIG. 4.

FIG. 5 is a waveform diagram for explaining operation of the circuit shown in FIG. 4.

Referring now to FIG. 5, the operation of the circuit shown in FIG. 4 is described. During erasing of the magnetic disc 10, the erase command signal ($\overline{Erase}$) is input to the input terminal 48, and the first one shot multivibrator 34 outputs a high level signal $Q_1$ over the period $T_1$ in response to the falling of the erase command signal $\overline{Erase}$ (FIG. 5). The period $T_1$ is determined by the time constant of a resistor $R_1$ and a capacitor $C_1$. In addition, the second one shot multivibrator 36 outputs a high level signal $Q_2$ over the period $T_2$ in response to the falling of the high level signal $Q_1$ output from the first one shot multivibrator 34 (FIG. 5). The period $T_2$ is determined by the time constant of a resistor $R_2$ and a capacitor $C_2$.

During the output period $T_1$ of the above described high level signal $Q_1$, the switch SW4 is closed, so that the output of the oscillator 30 is supplied to the gain variable amplifier 46. In addition, during the output period $T_2$ of the high level signal $Q_2$, the switch SW5 is closed, so that the output of the oscillator 32 is supplied to the gain variable amplifier 46. More specifically, an output to the gain variable amplifier 46 is a signal represented by $E_{S1}$ in FIG. 5.

Furthermore, during the period $T_1$, the high level signal $Q_1$ is input to the differentiating circuit 40 comprising a resistor $R_4$, a diode $D_4$ and a capacitor $C_4$ and operating only in the falling direction. The differentiating circuit 40 outputs a signal $Q'_1$ (FIG. 5) and applies the same to one input of the OR circuit 42. In the period $T_2$, the high level signal $Q_2$ is input to the differentiating circuit 38 comprising a resistor $R_3$, a diode $D_3$ and a capacitor $C_3$ and operating only in the falling direction. The differentiating circuit 38 outputs a signal $Q'_2$ (FIG. 5) and applies the same to the other input of the OR circuit 42. The OR circuit 42 outputs a signal $Q_3$ in response to the signals $Q'_1$ and $Q'_2$ (FIG. 5). In the periods $T_1$ and $T_2$, when the signal $Q_3$ is at a high level, the switch SW3 is closed, so that a constant supply voltage $V_{CC}$ is applied to the gain variable amplifier 46 as a control voltage $V_g$ which defines the gain of the gain variable amplifier 46. Therefore, while the signal $Q_3$ is at a high level, an output signal $E_S$ of the gain variable amplifier 46 has a constant amplitude (FIG. 5). After the signal $Q_3$ falls so that the switch SW3 is opened, the time constant circuit comprising a resistor $R_5$ and a capacitor $C_5$ is discharged, so that the value of the control voltage $V_g$ is gradually decreased (FIG. 5). Therefore, while the signal $Q_3$ is at a low level, the amplitude of the output signal $E_S$ of the gain variable amplifier 46 is attenuated.

The on selection of the frequency of the erasing signal $f_2$ will now be described. When the erasing signal $f_1$ is set in the vicinity of 10 MHz, it is necessary that the frequency of the erasing signal $f_2$ is within 15 MHz to 23 MHz in order to erase the residual signal of the erasing signal $f_1$. However, when the erasing signal $f_2$ of 15 MHz is used, another problem occurs. More specifically, the residual component of 15 MHz and a carrier wave (7 MHz) of a luminance signal frequency-modulated at the time of re-recording produce beat, so that noise of 8 MHz ($=15$ MHz$-7$ MHz) is generated. If the signal in which noise was generated is FM-demodulated, the noise of 1 MHz ($=8$ MHz$-7$ MHz) appears on a reproduced picture. However, if the frequency of the beat is larger than the upper limit of the sideband of the frequency-modulated luminance signal (11.5 MHz which is the upper limit of the sideband in the range from $+4.5$ MHz to $-4.5$ MHz with respect to the carrier wave, that is, from 2.5 MHz to 11.5 MHz), the problem of practical use does not occur. Therefore, the frequency of the erasing signal $f_2$ must be a value satisfying $f_2 - 7 > 11.5$, i.e., more than 18.5 MHz. The condition is related to the case where the level of a picture signal is intermediate and constant. In practice, the level of the picture signal varies, so that the carrier wave varies in the range of $\pm 0.5$ MHz and correspondingly, the band of the sideband is in the range of 2.0 MHz to 12.0 MHz. Therefore, in consideration of such variation, the frequency of the erasing signal $f_2$ is set more than 19 MHz. Furthermore, if the frequency of the erasing signal $f_2$ is set more than 25 MHz, the erasing signal $f_1$ of 10 MHz is not effectively erased.

Although in the above described embodiment, two kinds of erasing signals $f_1$ and $f_2$ are described, the present invention is not limited to the two kinds.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for erasing a signal in a recording track formed on a magnetic disc, comprising the steps of:

erasing said recording track by supplying through a magnetic head having a single winding a first AC erasing signal having a first frequency and a first duration and performing a damping oscillation over at least a first predetermined damping oscillation period following a first predetermined stationary oscillation period during said first duration, and erasing again said recording track erased by said first AC erasing signal by supplying through said magnetic head a second AC erasing signal having a second frequency higher than said first frequency and a second duration and performing a damping oscillation over at least a second predetermined damping oscillation period following a second predetermined stationary oscillation period during said second duration.

2. A method in accordance with claim 1, wherein said first and second duration are equal to each other.

3. A method in accordance with claim 1, wherein said first and second predetermined damping oscillation periods are equal to each other.

4. A method in accordance with claim 1, wherein said first frequency is the frequency in the vicinity of an upper limit of the band of a signal recorded on said track, and
said second frequency is an upper limit of frequency which is outside of the band of said recorded signal and can be recorded and reproduced by said magnetic head.

5. A method in accordance with claim 4, wherein said recorded signal includes a frequency-modulated luminance signal,
said frequency-modulated luminance signal comprises
a carrier wave component with a predetermined frequency, and
a predetermined band with respect to said carrier wave component, and
said second frequency is set such that the frequency of the difference between said second frequency and the predetermined frequency of said carrier wave component may be larger than an upper limit of frequency of said predetermined band.

6. A method in accordance with claim 5, wherein the predetermined frequency of said carrier wave component is in the vicinity of about 7 MHz,
said predetermined band is in the range of about 2.5 to 11.5 MHZ, and
said second frequency is set in the range of about 19 to 23 MHz.

7. An apparatus for erasing a signal in a recording track formed on a magnetic disc, comprising:

a magnetic head (14) having a single winding and used for at least erasing of said recording track, erasing signal forming means (22) for generating sequentially a first AC erasing signal having a first frequency and a first duration and performing a damping oscillation over at least a first predetermined damping oscillation period following a first predetermined stationary oscillation period during said first duration and a second AC erasing signal having a second frequency higher than said first frequency and a second duration and performing a damping oscillation over at predetermined damping oscillation period following a second predetermined stationary oscillation period during said second duration and outputting the same, means (48) for inputting an erase command signal, and means (SW1, SW2) responsive to said erase command signal for supplying said magnetic head with said first and second erasing signals output from said erasing signal forming means.

8. An apparatus in accordance with claim 7, wherein said first frequency is the frequency in the vicinity of an upper limit of the band of a signal recorded on said track, and
said second frequency is an upper limit of frequency which is outside of the band of said recorded signal and can be recorded and reproduced by said magnetic head.

9. An apparatus in accordance with claim 7, wherein said erasing signal forming means (22) comprises
means (30) for generating the signal with said first frequency,
means (32) for generating the signal with said second frequency,
means (34) for defining said first duration,
means (36) for defining said second duration, gain variable amplifier means (46),
first switching means (SW4) for selecting the signal with said first frequency and applying the same to said gain variable amplifier means during said first duration,
second switching means (SW5) for selecting the signal with said second frequency and applying the same to said gain variable amplifier means during said second duration, and
means (38, 40, 42, 44, SW3) for defining said first and second predetermined periods and changing the gain of said gain variable amplifier means during the periods.

* * * * *